(12) United States Patent
Persson et al.

(10) Patent No.: US 11,001,204 B2
(45) Date of Patent: May 11, 2021

(54) LOAD CARRIER

(71) Applicant: Thule Sweden AB, Hillerstorp (SE)

(72) Inventors: Joakim Persson, Skillingaryd (SE); Anders Nilvius, Värnamo (SE); Morgan Lindell, Värnamo (SE); Eric Gustavsson, Värnamo (SE); Niklas Kronborg, Lund (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 16/621,189

(22) PCT Filed: Jun. 12, 2018

(86) PCT No.: PCT/EP2018/065477
§ 371 (c)(1),
(2) Date: Dec. 10, 2019

(87) PCT Pub. No.: WO2018/229044
PCT Pub. Date: Dec. 20, 2018

(65) Prior Publication Data
US 2020/0377030 A1   Dec. 3, 2020

(30) Foreign Application Priority Data
Jun. 12, 2017 (EP) .................................. 17175470

(51) Int. Cl.
*B60R 9/058* (2006.01)

(52) U.S. Cl.
CPC .................................. *B60R 9/058* (2013.01)

(58) Field of Classification Search
CPC ........... B60R 9/04; B60R 9/058; B60R 9/045; B60R 9/052; Y10T 16/5407
See application file for complete search history.

(56) References Cited

U.S. PATENT DOCUMENTS 4,063,774 A * 12/1977 Hanks ...................... B60J 7/041
296/216.04
4,244,501 A * 1/1981 Ingram .................. B60R 9/045
224/324

(Continued)

FOREIGN PATENT DOCUMENTS

| DE | 102008064346 A1 | 6/2010 |
|----|----|----|
| GB | 2221664 A | 2/1990 |
| KR | 20150062269 A | 6/2015 |

OTHER PUBLICATIONS

International Search Report and Written Opinion of the International Searching Authority for International Application No. PCT/EP2018/065477, European Patent Office (EPO), Berlin, dated Aug. 31, 2018, 11 pages.

*Primary Examiner* — Brian D Nash
(74) *Attorney, Agent, or Firm* — Sterne, Kessler, Goldstein & Fox P.L.L.C.

(57) ABSTRACT

Disclosed is a roof rack attachment arrangement for a roof rack for carrying a load on a vehicle roof including an elongated attachment member body. The attachment member body has a length along a longitudinal axis thereof. The attachment member body includes a first portion that is configured to be attached to a vehicle and a second portion that is configured to be attached to a roof rack. The attachment member body is configured to be movable between an operative position and a storage position.

19 Claims, 3 Drawing Sheets

(56) References Cited

U.S. PATENT DOCUMENTS

| | | | | |
|---|---|---|---|---|
| 4,383,627 A * | 5/1983 | Ingram | B60R 9/04 | 224/315 |
| 4,448,336 A * | 5/1984 | Bott | B60R 9/04 | 224/309 |
| 4,469,261 A * | 9/1984 | Stapleton | B60R 9/045 | 224/321 |
| 4,911,348 A * | 3/1990 | Rasor | B60R 9/045 | 224/321 |
| 5,096,106 A * | 3/1992 | Foster | B60R 9/045 | 16/349 |
| 5,282,562 A * | 2/1994 | Legault | B60R 9/058 | 224/326 |
| 5,411,196 A * | 5/1995 | Lee, Jr. | B60P 7/135 | 224/315 |
| 5,497,925 A * | 3/1996 | Lumpe | B60R 9/04 | 224/309 |
| 5,556,016 A | 9/1996 | Arvidsson | | |
| 7,204,396 B1 * | 4/2007 | Stapleton | B60R 9/04 | 224/309 |
| 7,458,490 B2 * | 12/2008 | Klinkman | B60R 9/045 | 224/321 |
| 7,721,925 B1 * | 5/2010 | Graffy | B60R 9/058 | 224/329 |
| 8,028,875 B2 * | 10/2011 | Kmita | B60R 9/045 | 224/321 |
| 8,960,734 B2 * | 2/2015 | Camp | E05B 17/0037 | 292/193 |
| 9,187,047 B2 * | 11/2015 | Sautter | B60R 9/045 | |
| 9,371,041 B2 * | 6/2016 | Almhill | F16M 13/02 | |
| 2006/0103157 A1 * | 5/2006 | Raffler | B60R 9/04 | 296/29 |
| 2006/0157524 A1 * | 7/2006 | Jung | B60R 9/04 | 224/555 |
| 2006/0196905 A1 * | 9/2006 | Shaukat | B60R 9/045 | 224/321 |
| 2011/0192870 A1 * | 8/2011 | Michie | B60R 9/048 | 224/309 |
| 2013/0299539 A1 * | 11/2013 | Bocker | B60R 9/00 | 224/309 |
| 2014/0097218 A1 * | 4/2014 | Bittner | B60R 9/058 | 224/309 |
| 2014/0143990 A1 * | 5/2014 | Sautter | B60R 9/04 | 24/68 CD |
| 2015/0321618 A1 * | 11/2015 | Almhill | F16M 13/02 | 224/331 |
| 2018/0037170 A1 * | 2/2018 | Millington | B60R 9/048 | |
| 2018/0236946 A1 * | 8/2018 | Shen | B60R 9/052 | |
| 2019/0225161 A1 * | 7/2019 | Dickinson | B60R 9/055 | |
| 2020/0031289 A1 * | 1/2020 | Williams | B60R 9/045 | |
| 2020/0079293 A1 * | 3/2020 | Gaither | B60R 9/045 | |
| 2020/0114829 A1 * | 4/2020 | Chen | B60Q 1/2611 | |
| 2020/0148126 A1 * | 5/2020 | Griffith | B60R 9/045 | |
| 2020/0148127 A1 * | 5/2020 | Borghi | B60R 9/058 | |
| 2020/0189368 A1 * | 6/2020 | Potter | B60J 7/102 | |
| 2020/0325685 A1 * | 10/2020 | Figge | E04D 5/145 | |

* cited by examiner

LOAD CARRIER

TECHNICAL FIELD

A roof rack attachment arrangement for a roof rack for carrying a load on a vehicle roof comprising an elongated attachment member body.

BACKGROUND

Roof racks are attached in different ways dependent on the vehicle roof, e.g. with bracket clamping against door edges, clamping around or against flush or raised railings. Many vehicles have so called fixed points, i.e. designated positions often with some kind of means for securing the feet. It can be threaded nuts welded to the roof in channels. The common way to utilize these fix point positions is by attaching the feet with threaded bolts or screws. However, the mounting procedure when mounting four feet with cross bars can be cumbersome and time consuming. There is a desire to facilitate this procedure. Also, it is a desire to increase safety, e.g. avoid having the feet coming off in collisions or heaving breaking when strong forces are acting on the components in a roof rack system comprising feet and cross bars.

U.S. Pat. No. 5,556,016 shows a roof rack attachment member, where the roof is provided with a hook shaped attachment member, where a coupling device arranged in a foot of a roof rack is attached to the hook, and a threaded screw is used to provide a tensioning mechanism for the attachment.

SUMMARY

In accordance with the invention there is provided a roof rack attachment arrangement for a roof rack for carrying a load on a vehicle roof comprising: an elongated attachment member body, said attachment member body having a length along a longitudinal axis thereof, the attachment member body comprising a first portion that is configured to be attached to a vehicle and a second portion that is configured to be attached to a roof rack, wherein the attachment member body is configured to be movable between an operative position and a storage position.

By providing an elongated attachment member that is attached to a vehicle, and can be moveable between an operative position and a storage position, it is possible to provide a very simple attachment arrangement, where the attachment member is attached to the vehicle prior to the mounting of the roof rack. By providing an operative position and a storage position, the attachment member can be used together with the roof rack, when such a rack is attached to the vehicle, and when it is removed, the attachment member may be moved to a storage position, where it may be e.g. stored within a volume inside the vehicle, such as in a fix point area, an internal railing, or similar arrangements. Thus, the roof rack may be attached to the vehicle without using any components that have to be stored separately, as the foot of the roof rack may attach directly to the elongated attachment member. Furthermore, the arrangement is also advantageous, as the necessary attachment member to the car can be hidden away when it is not in use, which improves the air flow around the vehicle, compared to e.g. a roof railing, as the attachment member may be tucked away inside a volume of the vehicle.

The fix point anchor may be a depression or a slot in the roof of the vehicle, where the slot is provided with a threaded coupling or similar attachment means, where the fix point may be covered with a cap or a hood when it is not in use, and where the cap is removed when the fix point is in use. The attachment arrangement may be attached to the fix point anchor, and when in use the elongated attachment member extends outwards from the slot to be able to receive a roof rack, i.e. the operating position, and where the elongated attachment member may be tucked inside the slot when it is not in use, and where the cap or cover may be arranged to cover the slot when not in use, i.e. the storage position.

In one embodiment the the operative position may be where the attachment member body extends from the vehicle and/or where the storage position is where the attachment member body is stowed in a pocket or channel of the vehicle roof. This means that the attachment member body during use may be substantially in a straight shape, where it extends outwards from the roof of the vehicle, to a curved shape where it has been bent sideways at an angle from its straight shape, into a storage position where it may be hidden or tucked away from view.

In one embodiment the attachment member body may comprise or consist of a flexible strand or rod being capable of bearing a mechanical load, while being capable of flexing when subjected to an external load applied at an angle to said longitudinal axis of the attachment member body. By providing a flexible attachment member body, the first portion may be securely attached to a part of the vehicle, such as a fixed point anchor, and where the flexible member may be stored by bending the flexible from its longitudinal axis into a curved shape, where the second portion may also be inserted into the same area as the first portion.

In one embodiment the roof rack arrangement may further comprise a load carrier foot which in the operative position is configured to be attached to the elongated attachment body. The provision of an elongated attachment body allows for a simple attachment of a load carrier foot to the roof of the car. The load carrier foot may be adapted to have a coupling element, that allows for a direct attachment to the elongated attachment body, so that the user can position the foot at the elongated attachment body, and the foot may be coupled directly to the elongated body. Thus, there is no need for any additional fixation element, other than the rack foot and the elongated element.

In one embodiment the roof rack arrangement may be configured to be attached to the second portion of the elongated attachment body. The second portion of the elongated attachment body may be configured in such a way that the roof rack is may be coupled directly to the elongated attachment body. Thus, the first portion of the elongated body may be directly attached to the vehicle while the second portion of the elongated body may be directly attached to the roof rack foot. Thus, the elongated attachment member body may be used to clamp the roof rack foot directly to the vehicle and/or the roof of the vehicle, by attaching the first portion to the roof and the second portion to the roof rack foot, and a tensioning force is applied to the elongated attachment member body to clamp the roof rack foot to the vehicle.

In one embodiment the load carrier foot may comprise a coupling member that is configured to couple with the second portion of the elongated attachment member body. The coupling member may configured to mate with the second portion of the elongated attachment member body, so that when the load carrier foot is positioned on the vehicle the second portion of the body may be mated with the coupling member of the roof rack foot. Examples of such coupling elements, may be a slot and tab configuration, a hook and loop configuration, clasp and a hasp, or other types of mating configurations that are capable of carrying a tensioned coupling between the vehicle and the roof rack foot via the elongated member.

In one embodiment the attachment member body in a use position may be configured to extend from a fixed point attachment of a vehicle to an attachment part of a roof rack, and wherein the attachment member in a storage position may be configured to extend from a fixed point attachment of a vehicle in a direction that is away from the first longitudinal direction. The fix point of a vehicle may be arranged in a slot on the roof, where the slot may have a width a depth and a length that may vary from vehicle to vehicle, but has generally a certain depth that allows for a fix point attachment member, and a length that extends along the longitudinal axis of the vehicle. The length of the elongated member may be adapted to match or correspond to the length of the fix point slot, or at least part of the length of the fix point slot, so that when the elongated attachment member is not in use, it may be configured to be stored inside the slot, while still being attached to the fix point attachment member. Thus, it is possible to hide the elongated member inside the slot when the attachment member is not in use. Further, when the roof rack is to be attached to the roof of the vehicle, the elongated attachment member may be extracted, at least partly from the slot, so that the body extends from inside the slot to the outside of the slot, while still being attached to the fix point attachment member, so that a roof rack may be attached to the second portion of the elongated attachment member body, and the roof rack may be attached to the roof via tensioning of the elongated attachment member body.

In one embodiment the elongated attachment member body may comprise or consist of an element or a wire constituted by a bundle of strands twisted into a helical form or braided together. This means that a part of the elongated attachment member body may be in the form of a wire, where the wire may be flexible so that it may be bent along its longitudinal axis. The wire may be provided as a loop, where one end of the loop is attached to the vehicle, and the opposite end is adapted to be attached to the roof rack.

The wire may further be provided as having two ends, where one end is adapted to be attached to the vehicle and the second end is adapted to be attached to the roof rack. Furthermore, the wire may be provided with two ends, where both ends are attached to the vehicle, and the middle section of the wire is adapted to be attached to the roof rack, creating a U shaped loop.

In one embodiment the longitudinal elongated body may be flexible in at least one direction deviating from said longitudinal axis. Thus, the elongated body may be adapted to flex along its longitudinal axis, so that it may be bent and shaped into a suitable form, while still being capable of being tensioned between a roof rack and the vehicle.

In one embodiment the longitudinal elongated body may be configured to be attached to the vehicle in a hinging arrangement where it may be moved via the hinge from its operative position to its storage position and vice versa. Thus the elongated body may be a rigid or a flexible member, where the attachment to the vehicle may be in the form of an attachment member that allows the elongated member to be securely attached to the vehicle, while still being able to be pivoted along the hinge. Thus, when the elongated member body is manoeuvred from its use position to its storage position, it may be pivoted via the hinge or the hinging element.

In one embodiment the elongated attachment member body may comprise a first end and a second end. The first end may be part of the first portion of the elongated attachment member body, while the second end may be part of the second portion of the elongated attachment member body.

Within the meaning of the present invention the first end and the second end are indications of the areas of the attachment member where the attachment member may be attached to a different entity, such as a vehicle and/or a roof rack, where the ends may comprise more than one connection point, such as a loop that is connected to a vehicle with two connection points, while the opposing part of the loop is used to connect to e.g. a roof rack body.

In one embodiment the wire may be a loop wire having two one stop at each end, where the wire is a 2 mm thick steel or stainless steel wire. In one embodiment, the wire may be a 3.5 mm thick steel wire. The wires may be have between 40 and 140 thread, where specific examples show that a wire having 49 threads is relatively stiff, while a wire having 133 threads is softer and more flexible. The material is stainless steel to reduce the risk of corrosion, and the wires may be provided by WR Control. Optionally the stop members may be made of zink or stainless steel.

In one embodiment the bending moment of the attachment member body may be low enough for it to be bendable by the hand/fingers of the user, optionally without plastically deforming the attachment member body. Thus, the flexibility of the elongated attachment member body may be adapted in such a manner that the user may easily bend and flex the elongated member using the hand, in order to move the elongated body from its use position to its storage position, and vice versa. Furthermore, it may be advantageous, that the flexing of the elongated attachment member body is does not change the mechanical capabilities of the body, so that any flexing of the elongated member using the hand or the fingers, will not result in damage to the elongated member. This may be achieved by providing the body with material properties that ensure that the plastic deformation of the body is above a predetermined force, where the force is above what is possible using the hand or the fingers of the hand.

In one embodiment the attachment member body can be resiliently flexible/bendable so that it is configured to substantially return to its non-flexed state upon removal of a flexing force or so that it is configured to be flexed/bent and retains it flexed/bent shape until it is again subjected to a bending force. Thus the elongated attachment member body may be provided with a material memory, so that it will seek to have a natural position when no outside force is applied to the body. Thus, the attachment member body may be configured to naturally extend into its use position, so that when the user has maneuvered the body from its storage position it will maintain its use position while the roof rack is being coupled to the attachment member body. Furthermore, this may mean that when the body is in its storage position, it may be harnessed or pressed into its storage position to ensure that it does not return to its use position until it is supposed to do so.

The attachment member body may biased in its position using a biasing member element that is applied to the body to bias it into either its use position and/or its storage position.

In one embodiment the first end is a first attachment portion and may be constituted by a first free end of said attachment member body and the second attachment portion may be constituted by a second free end of said attachment member body. Thus, the first free end of the body may be coupled to the vehicle while the second free end may be coupled to the roof rack, and the elongated body functions as the mechanical connection between the vehicle and the roof rack, where tension may be applied to the body to fix a part of the roof rack relative to the vehicle.

In one embodiment the attachment member body may be substantially unyielding along its longitudinal axis. Thus, the body is adapted to be capable of receiving a tension force along the longitudinal axis of the body, so that the tension is transferred substantially directly from the vehicle to the roof rack, or vice versa, without absorbing any of the tensioning force. Furthermore, the body may have a length or a longitudinal dimension that does not change when a sufficient tension is applied to the elongated attachment member body.

Within the meaning of the present invention the term unyielding means that the attachment member body maintains its length during normal use, i.e. that it does not stretch in a substantial way and that it is capable of withstanding a significant amount of tension when in use without being deformed along its longitudinal axis. I.e. that the attachment member body is capable of maintaining a constant tension between two elements that are attached to each other.

In one embodiment the attachment member body may comprise permanent or removable stop members at its first and/or second end. The stop member may be in the form of a nipple, a head portion, a loop, which allows the elongated attachment member body to be attached to a second entity, such as the roof rack and/or the vehicle, using a mating attachment member.

The invention may also relate to a roof rack attachment assembly comprising: a roof rack anchor configured to be coupled or connected with a fix point connector of a vehicle roof, and roof rack attachment arrangement according to the present description.

In one embodiment the fix point anchor may comprise a first portion adapted to receive and/or fix a first end of the attachment member body to a fix point connector of a vehicle. The fix point anchor may e.g. be a slot, an opening in the vehicle, a suitable bracket or a bolt attached to the vehicle, where the elongated attachment member body may be securely fixed to the fix point anchor. This means that the fix point anchor may be permanently attached to the vehicle, where the first area is of a dimension allowing the elongated attachment member body to be fixedly attached to the fixed point anchor.

In one embodiment the roof rack assembly comprises an attachment arrangement connection portion providing a releasable connection with the attachment arrangement, preferably in that the attachment arrangement connection portion comprise a slot with overhanging walls that can receive and hold the and end portion of the attachment arrangement, preferably configured as a key-hole with a larger opening for entering the end portion leading into the slot.

In one embodiment the vehicle attachment portion of anchor adapted to receive a bolt for securing to fix point of vehicle, preferably bolt also prevents wire from detaching from anchor.

In one embodiment the fix point anchor may comprise a second area adapted to receive and/or fix the first end of the attachment member body, where first and second area are connected to each other. Thus, the second area may transition into the first area, so that the elongated attachment member body may be inserted into the second area, and maneuvered from the second area to the first area in order to secure the attachment member body to the vehicle. The dimensions of the second area may e.g. be larger than the first area, so that a stop member of the elongated attachment member may have a dimension that is smaller than the second area, while simultaneously having a dimension that is larger than the first area. An example of this arrangement may e.g. be a fix point anchor that has slot that is in the form of a keyhole, where the second area is a circular opening and the first area is a longitudinal slot extending from the circular opening, where the width of the longitudinal slot is smaller than the circular opening. Thus, the first portion of the elongated body may be inserted into the circular opening, and slid into the longitudinal slot, where a stop member attached to an end of the elongated body, is on one side of the slot (vehicle facing surface) while the remaining parts of the elongated member faces the opposite side of the slot (surroundings facing surface).

In one embodiment the anchor may comprise a fixing member to prevent the first end of the attachment member from moving from the first area to the second area or vice versa. The fixing member may be adapted to be inserted into the first area of the fix point anchor, where the fixing member may fill out the first area, and thereby close the access from the second area to the first area. The fixing member may be removeably attached in the second area, so that the user may selectively insert and remove the fixing member from the second area. Thus, the fixing member may be utilized to ensure that the elongated attachment member body is securely fastened in the first area and prevent it from being maneuvered from the first area to the second area.

In one embodiment the anchor may comprise a receiving area for the second end of the attachment member body in its storage position, where the receiving area optionally comprises a locking member to maintain the second end in its storage position. The receiving area may be adapted to encompass the second end, so that the second end may be maneuvered into the receiving area and be maintained in its storage position.

In one embodiment the coupling member may comprise a tensioning mechanism to apply a load to the second end of the attachment member body. The tensioning mechanism may be arranged in the foot of the roof rack, where the tensioning mechanism is adapted to couple to the second portion of the attachment member body while the first portion is attached to the vehicle, and when the coupling has been made, a tensioning force may be applied to the body so that the tension forces a vehicle facing surface of the roof rack foot in a direction towards the vehicle in order to clamp the foot to the vehicle.

The invention may also relate to a vehicle comprising a roof rack attachment member in accordance with the description and/or carrier roof rack attachment assembly in accordance with the description and/or a roof rack in accordance the description.

The invention may also relate to a roof rack attachment arrangement for a roof rack for carrying a load on a vehicle roof comprising: an elongated attachment member body, having a first portion that is configured to be attached to a vehicle, a second portion that is configured to be attached to a roof rack, wherein in that the elongated attachment member body is flexible in at least one direction deviating from said longitudinal axis. The roof rack attachment arrangement may be used in accordance with all embodiments of the elongated attachment member body in accordance with the invention, or embodiments of the roof rack attachment arrangement in accordance with the invention.

DETAILED DESCRIPTION

Figure 1:
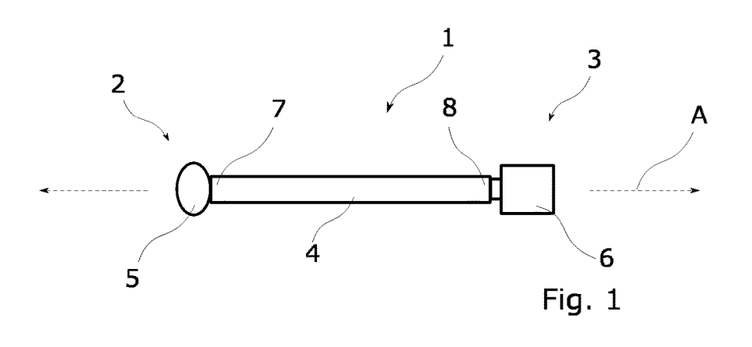
FIG. 1 shows an elongated attachment member body.

FIG. 1 shows an attachment member 1 having a proximal part 2 and a distal part 3, where the attachment member comprises a body 4 having a longitudinal axis A, where the body 4 extends between a proximal stop member 5 and a distal stop member 6. The proximal 5 stop member is attached to a proximal end 7 of the body 4 and the distal stop member 6 is attached to a distal end 8 of the body. The stop members 5,6 are dimensioned to have a larger radial diameter than the body 4, in order to provide an area which may be coupled to either the vehicle and/or a roof rack, where the stop members 5,6 provide a structural dimension which can be gripped or constrained by a mating coupling on the vehicle and/or the roof rack.

Figure 2A:
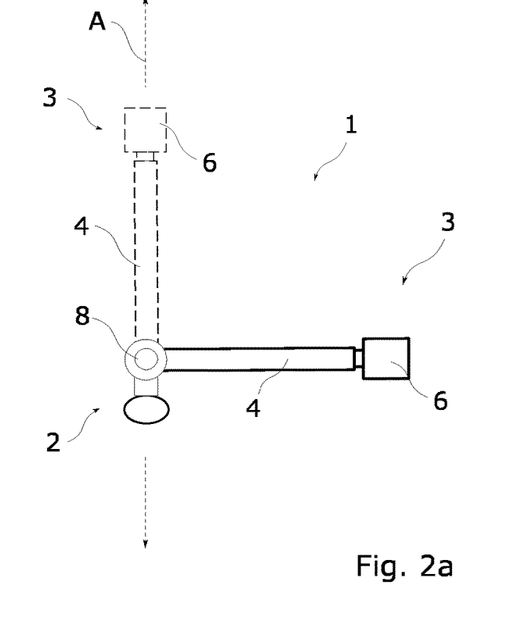
FIGS. 2a and 2b show an elongated attachment member body in its storage position.

FIG. 2a shows one embodiment of the attachment member 1, where the body 4 has been provided with a hinge joint 8, which allows the distal part of the attachment member 1 to be pivoted from its elongated state (shown with broken lines), where its extends along the longitudinal axis A, to an angled state, where the distal part of the attachment member is angled away from the longitudinal axis A via the hinge joint. The first state, where the elongated body extends along the longitudinal axis A, may be seen as a use position of the attachment member 1, while the second state, where the body 4 is angled away from the longitudinal axis may be seen as a storage position. The body 4 may be formed from a rigid or a flexible material, which is capable of maintaining its mechanical properties along its longitudinal axis, allowing a sufficient tensioning force to be applied to the attachment member, or the body.

Figure 2B:
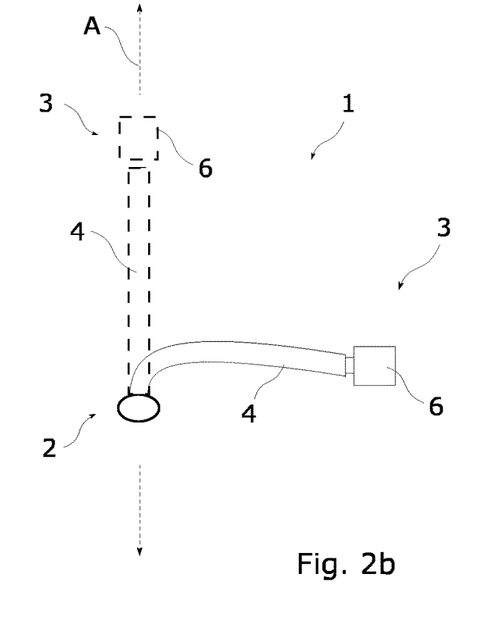

FIG. 2b shows another embodiment of the attachment member 1, where the body 4 is made of a flexible material. The flexible material allows the distal part of the attachment member 1 to be bent from its elongated state (shown with broken lines), where its extends along the longitudinal axis A, to a bent (flexed) state, where the distal part of the attachment member is angled away from the longitudinal axis A via the bending of the body 4. The first state, where the elongated body extends along the longitudinal axis A, may be seen as a use position of the attachment member 1, while the second state, where the body 4 is angled away from the longitudinal axis may be seen as a storage position. The flexible material of the body, may be in the form of a flexible metal, compound material, a polymer or any other suitable material that is bendable, while still maintaining its mechanical properties along its longitudinal axis, allowing a sufficient tensioning force to be applied to the attachment member, and the body.

Figure 3A:
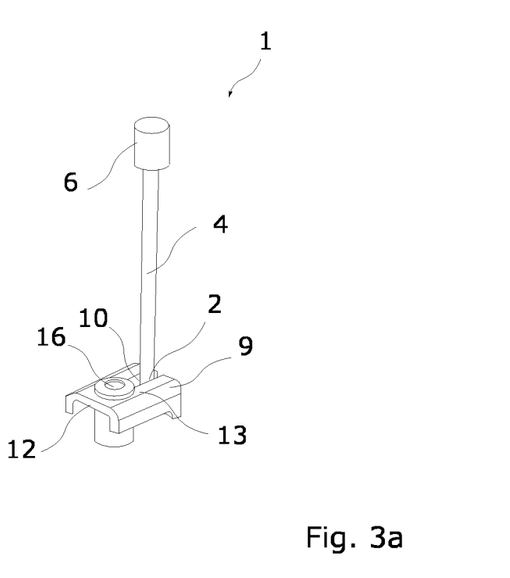
FIGS. 3a and 3b show an embodiment of an elongated attachment member body having an fixed point anchor.

FIG. 3a, shows a perspective view of one embodiment of an attachment member 1, where the attachment member has been introduced into a fix point anchor 9 (or a vehicle anchor), where the fix point anchor 9 comprises a slot 10, which is capable of receiving the proximal end 2 of the attachment member 1, and has a slot portion 11 that is dimensioned to allow the body 4 to slide into the slot, while retaining the stop member 5 one the vehicle facing side 12 of the anchor 9, while allowing the remaining parts of the attachment member 1, i.e. the proximal part 3 to remain on the opposite side 13 (surroundings side) of the attachment member 1.

Figure 3B:
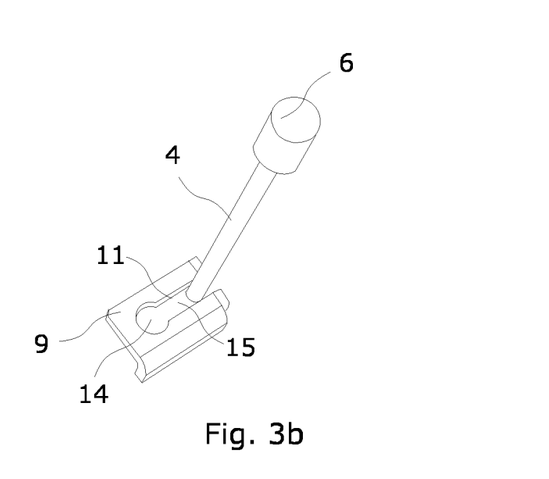

The slot 10, which is shown in more detail in FIG. 3b, comprises an insertion area 14, that allows the distal part 2 and the stop member 5 of the attachment member 1 to be inserted into the slot, where the diameter of the insertion area 14 is larger than the diameter of the stop member 5. The slot further comprises a holding area 15, which extends from the insertion area 14, where the diameter of the opening is reduced compared to the insertion area, where the width of the opening of the holding area is smaller than the diameter of the stop member, but may be larger than the diameter of the body 4. Thus, the attachment member, may be slid from the insertion area 14 towards the holding area, and thereby securing the stop member 5 on the vehicle facing surface 12 of the anchor 9.

The anchor 9 may further be provided with a securing member 16, that is adapted to be inserted into the insertion area 14 of the anchor 9, where the securing member 16 may be fixed inside the opening of the insertion area 14, in order to prevent that the attachment member 1 and the stop member may slide from the holding area 15 and towards the insertion area 14. Thus, the securing member 16 is adapted to ensure that when the attachment member 1 has been introduced into the anchor, it cannot be moved from the anchor unless the securing member 16 has been removed. The securing member 16 may be fixed to the insertion area 14 using a locking coupling, threaded coupling, click coupling, or any other suitable coupling that ensures that the securing member 16 is fixedly attached inside the insertion area 14.

The anchor may be provided with structural features that ensures that the anchor may be attached to a vehicle, such as a locking bolt, or other forms of attachment means.

Figure 4A:
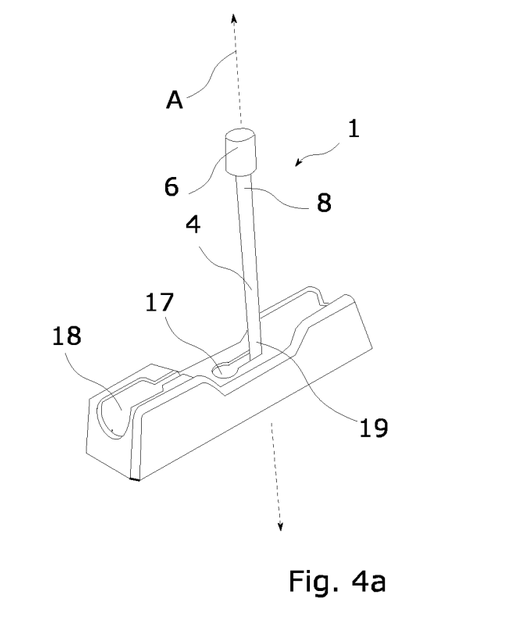
FIGS. 4a and 4b show an embodiment of an elongated attachment member body having an fixed point anchor.
Figure 4B:
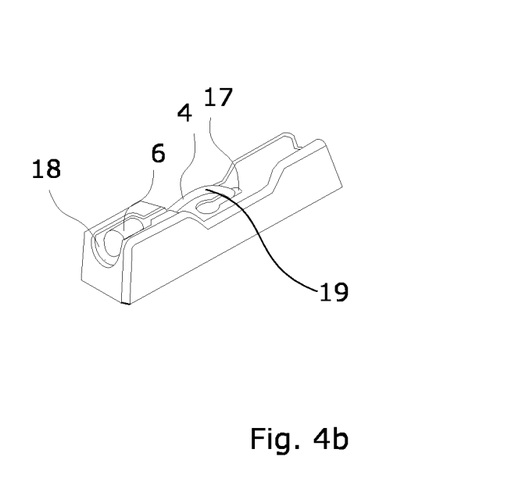

FIG. 4a, shows an attachment member 1 in a use position, where the proximal end 2 of the attachment member 1 is coupled with a vehicle adapter 17, where the vehicle adapter is provided with a holding element 18, which is provided at a distance from the securing area 19 where the proximal end 2 of the attachment member is attached to the adapter 17. The holding area may be shaped and formed as the inverted shape of the distal stop member 6 or the distal part 8 of the body 4 of the attachment member 1, so that when the body has been angled away from the longitudinal axis A, the distal stop member 6 or the distal part 8 of the body 4 may be inserted into the holding element 18, as shown in FIG. 4b, which shows a storage position of the attachment member. The holding element 18 may be formed in such a way, that when the attachment member is inserted, it fixes the attachment member in its bent shape, and thereby retains the attachment member in its storage position. The adapter may be applied externally above the roof channel with room for receiving and holding wire. The adapter 17 may comprise an anchor, similar to that shown in FIG. 3a and/or 3b, where the adapter is fixed to an anchor using a securing member 16.

Figure 5:
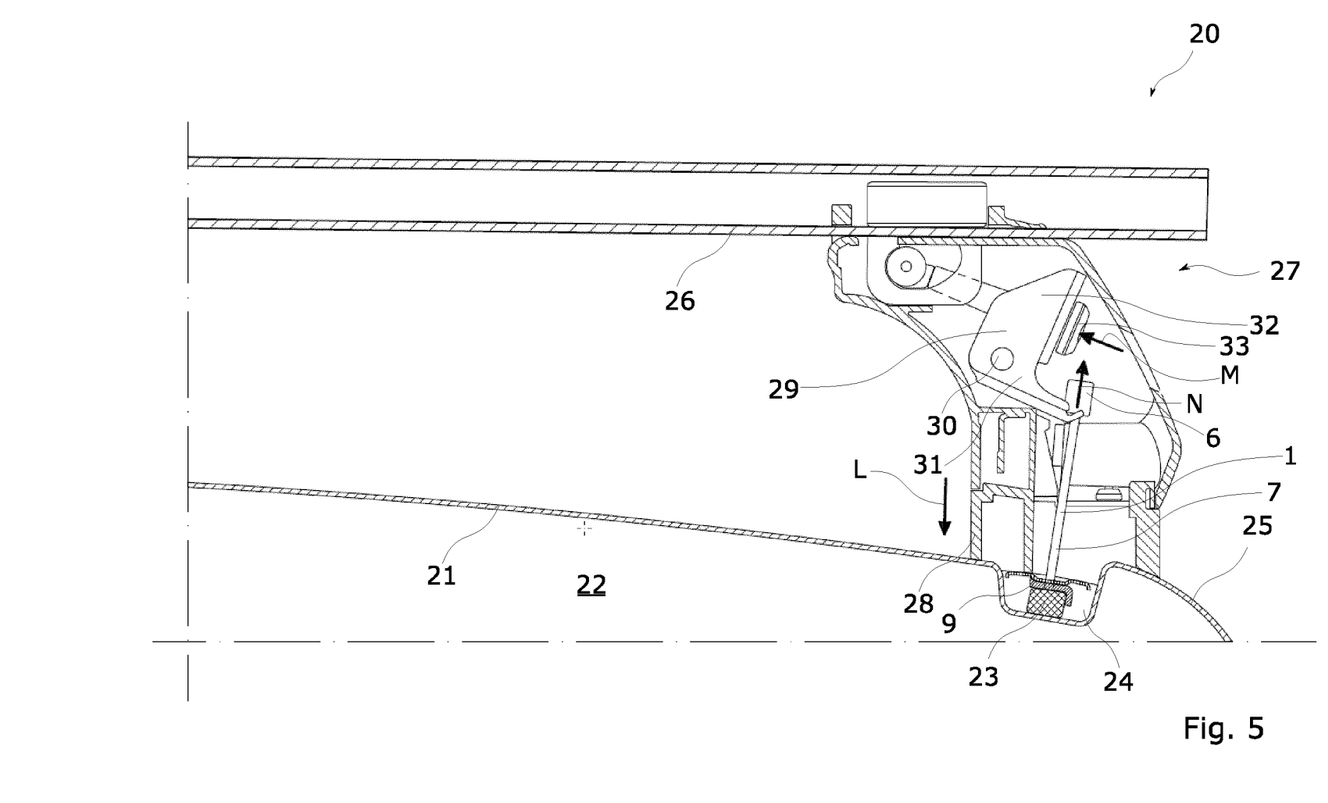
FIG. 5 shows a sectional diagram of a roof rack having an attachment arrangement in accordance with the invention.

FIG. 5 shows a roof rack 20, which is attached to the roof 21 of a vehicle 22, where the roof 21 comprises a fix point connector 23, which is positioned in a channel (depression) 24, which is positioned on the lateral periphery 25 of the roof.

The roof rack 20 and its attachments comprises a load carrying bar 26, a roof rack foot 27, an elongated attachment member 1, and a fix point anchor 9 which secures the elongated attachment member 1 to the fix point connector 23 of the vehicle 22. The roof rack foot comprises a lower part 28, which is configured to abut the roof 21 of the vehicle when the roof rack foot 27 is attached to the vehicle 22. The roof rack foot 27 further comprises an attachment bracket 29, which is pivotally attached to the roof rack foot 27 via a pivot point 30, where the attachment bracket 29 is substantially L-shaped, having a lower part 31 adapted to engage the distal stop member 6 of the elongated attachment member 1, when the proximal end 7 of the body is securely attached to the vehicle 22. The attachment bracket 29 comprises an upper part 32, which is configured to engage a threaded fastening member 33, where the fastening member 33 is configured to apply a force in the direction M to the upper part 32, causing the bracket 29 to pivot and thereby transferring the force in the direction N to the lower part 31 of the bracket 29. When the force is applied, and the lower part 31 of the bracket is engaged with the elongated attachment member 1, the force applied to the bracket 29 pulls on the elongated attachment member 1 in the direction N, causing the roof rack foot to be pulled in the direction L towards the roof 21 of the vehicle, and thereby clamping the roof rack foot 27 and the lower part 28 of the roof rack foot 27 in to the vehicle 22. Thus, the elongated attachment member 1 is adapted transfer a clamping force from the roof rack foot 27 to roof 21 of the vehicle, and secure the roof rack 20 to the fix point connector 23 of the vehicle 22.

The invention claimed is:

1. A roof rack attachment arrangement for a roof rack for carrying a load on a vehicle roof, comprising:
   an elongated attachment member body and a load carrier foot, the load carrier foot comprising a coupling member, the attachment member body having a length along a longitudinal axis thereof, the attachment member body comprising a flexible member, a first coupling portion that is configured to be attached to a vehicle, and a second coupling portion that is configured to be attached to the coupling member of the load carrier foot,
   wherein the attachment member body is configured to be movable between an operative position and a storage position,
   wherein the attachment member body in the operative position is configured to extend from a fixed point attachment of the vehicle to the coupling member of the load carrier foot in a first longitudinal direction,
   wherein the attachment member body in the storage position is configured to extend from the fixed point attachment of the vehicle in a second longitudinal direction that is angled away from the first longitudinal direction, and
   wherein the flexible member is configured to bear a mechanical load and configured to flex when subjected to an external load applied at an angle to the longitudinal axis of the attachment member body.

2. The roof rack attachment arrangement in accordance with claim 1, wherein the flexible member is twisted into a helical form or braided.

3. The roof rack attachment arrangement in accordance with claim 1, wherein the flexible member is flexible in at least one direction deviating from the longitudinal axis.

4. The roof rack attachment arrangement in accordance with claim 1, wherein the attachment member body comprises permanent or removable stop members at a first end, a second end, or both.

5. The roof rack attachment arrangement in accordance with claim 1, wherein a portion of the flexible member comprises a strand, a wire, a rod, or a combination thereof.

6. The roof rack attachment arrangement in accordance with claim 5, wherein the portion of the flexible member comprises a loop.

7. The roof rack attachment arrangement in accordance with claim 1, wherein a plastic deformation of the flexible member is above a predetermined force.

8. The roof rack attachment arrangement in accordance with claim 1, wherein the flexible member is configured to substantially return to a non-flexed state upon removal of a flexing force.

9. The roof rack attachment arrangement in accordance with claim 1, wherein the flexible member is configured to remain in a flexed state upon removal of a flexing force.

10. The roof rack attachment arrangement in accordance with claim 1, wherein the flexible member comprises a flexible metal, a compound material, a polymer, or a combination thereof.

11. The roof rack attachment arrangement in accordance with claim 1, wherein the flexible member is configured to be attached to the vehicle in a hinging arrangement and configured to move via a hinge from the operative position to the storage position and vice versa.

12. A roof rack system, comprising:
   a roof rack anchor configured to be coupled to a fix point connector of a vehicle roof; and
   a roof rack attachment comprising:
      an elongated attachment member body and a load carrier foot, the load carrier foot comprising a coupling member, the attachment member body having a length along a longitudinal axis thereof, the attachment member body comprising a flexible member, a first coupling portion that is configured to be attached to a vehicle and a second coupling portion that is configured to be attached to the coupling member of the load carrier foot,
      wherein the attachment member body is configured to be movable between an operative position and a storage position,
      wherein the attachment member body in the operative position is configured to extend from a fixed point attachment of the vehicle to the coupling member of the load carrier foot in a first longitudinal direction,
      wherein the attachment member body in the storage position is configured to extend from the fixed point attachment of the vehicle in a second longitudinal direction that is angled away from the first longitudinal direction, and
      wherein the flexible member is configured to bear a mechanical load and configured to flex when subjected to an external load applied at an angle to the longitudinal axis of the attachment member body.

13. The roof rack system in accordance with claim 12, further comprising an adapter having a vehicle connection portion and an attachment arrangement connection portion.

14. The roof rack system in accordance with claim 12, wherein the roof rack anchor comprises a first area configured to receive or fix a first end of the attachment member body to the fix point connector of the vehicle.

15. The roof rack system in accordance with claim 14, wherein the roof rack anchor comprises a fixing member configured to prevent the first end of the attachment member body from moving from the first area.

16. The roof rack system in accordance with claim 14, wherein the roof rack anchor comprises a second area configured to receive or fix the first end of the attachment member body, wherein the first and second areas are connected to each other.

17. The roof rack system in accordance with claim 12, wherein the roof rack anchor comprises a receiving area for a second end of the attachment member body in the storage position, wherein the receiving area comprises a locking member to maintain the second end in the storage position.

18. The roof rack system in accordance with claim 12, wherein the flexible member comprises a flexible material configured to flex and configured to maintain a mechanical property along the longitudinal axis.

19. The roof rack system in accordance with claim 12, wherein a bending moment of the flexible member is configured to be below a plastic deformation of the flexible member when the flexible member is bent.

* * * * *